(12) United States Patent
Guenther

(10) Patent No.: US 8,738,922 B2
(45) Date of Patent: *May 27, 2014

(54) METHOD AND DEVICE FOR ELECTRONICALLY CAPTURING A HANDWRITTEN SIGNATURE AND SAFEGUARDING BIOMETRIC DATA

(75) Inventor: Andreas Guenther, Esslingen a.N. (DE)

(73) Assignee: StepOver GmbH, Stuttgart (DE)

( * ) Notice: Subject to any disclaimer, the term of this patent is extended or adjusted under 35 U.S.C. 154(b) by 258 days.

This patent is subject to a terminal disclaimer.

(21) Appl. No.: 13/121,665

(22) PCT Filed: Sep. 30, 2008

(86) PCT No.: PCT/EP2008/008299
§ 371 (c)(1),
(2), (4) Date: Mar. 29, 2011

(87) PCT Pub. No.: WO2010/037407
PCT Pub. Date: Apr. 8, 2010

(65) Prior Publication Data
US 2011/0185184 A1 Jul. 28, 2011

(51) Int. Cl.
*G06F 21/00* (2013.01)
(52) U.S. Cl.
USPC .................................................. 713/182
(58) Field of Classification Search
USPC .................................................. 713/182
See application file for complete search history.

(56) References Cited

U.S. PATENT DOCUMENTS

| 5,195,133 | A | 3/1993 | Kapp et al. |
| 5,208,858 | A | 5/1993 | Vollert et al. |
| 5,297,202 | A | 3/1994 | Kapp et al. |
| 5,544,255 | A * | 8/1996 | Smithies et al. ............... 382/119 |
| 5,689,567 | A | 11/1997 | Miyauchi |
| 6,307,955 | B1 * | 10/2001 | Zank et al. ..................... 382/121 |

(Continued)

FOREIGN PATENT DOCUMENTS

| DE | 10112177 A1 | 9/2002 |
| DE | 10 2006 000 859 | 7/2007 |

(Continued)

OTHER PUBLICATIONS

Directive 1999/93/EC of the European Parliament and of the Council of Dec. 13, 1999 on a Community framework for electronic signatures.

(Continued)

*Primary Examiner* — Kambiz Zand
*Assistant Examiner* — Dant Shaifer Harriman
(74) *Attorney, Agent, or Firm* — J-Tek Law PLLC; Jeffrey D. Tekanic

(57) ABSTRACT

A method and apparatus for encrypting an electronic document involves a computer having a first monitor and a signature capture apparatus configured to capture a handwritten signature on a second monitor. A hash sum of the electronic document generated in the computer is transmitted to the signature capture apparatus. The electronic document and the first hash sum thereof are displayed on the first monitor. The first hash sum is also displayed on the second monitor. After electronically capturing the handwritten signature, the signature data and the first hash sum are encrypted in the signature capture apparatus and then transmitted to the computer. The encrypted signature data, the first hash sum and the signed document are stored on a computer-readable medium.

27 Claims, 4 Drawing Sheets

(56) References Cited

U.S. PATENT DOCUMENTS

| | | |
|---|---|---|
| 6,792,536 B1 | 9/2004 | Teppler |
| 7,024,562 B1 | 4/2006 | Flink et al. |
| 8,285,991 B2 * | 10/2012 | Scheidt .................. 713/170 |
| 2004/0019570 A1 | 1/2004 | Bolle et al. |
| 2004/0039914 A1 | 2/2004 | Barr et al. |
| 2004/0236694 A1 | 11/2004 | Tattan et al. |
| 2005/0132196 A1 | 6/2005 | Dietl |
| 2006/0242423 A1 | 10/2006 | Kussmaul |
| 2007/0050618 A1 | 3/2007 | Roux et al. |
| 2008/0010218 A1 | 1/2008 | Zank |
| 2008/0086636 A1 * | 4/2008 | Jung et al. .................. 713/163 |
| 2010/0106973 A1 | 4/2010 | Guenther |
| 2011/0179289 A1 | 7/2011 | Guenther |
| 2011/0231666 A1 | 9/2011 | Guenther |

FOREIGN PATENT DOCUMENTS

| | | |
|---|---|---|
| EP | 0440914 A2 | 8/1991 |
| EP | 1 014 293 | 6/2000 |
| EP | 1 258 795 | 11/2002 |
| EP | 1944716 A1 | 7/2008 |
| WO | 00/07330 A1 | 2/2000 |
| WO | 01/08352 A1 | 2/2001 |
| WO | 2006/111979 | 10/2006 |

OTHER PUBLICATIONS

N. Komninos et al., "Protecting Biometric Templates with Images and Watermarking Techniques", Advances in Biometrics, Springer Berlin Heidelberg, vol. 4642, pp. 114-123, Aug. 27, 2007.

U.S. Appl. No. 13/121,653, filed Mar. 29, 2011.

International Search Report for parent application PCT/EP2008/008299.

Written Opinion for parent application PCT/EP2008/008299.

U.S. Appl. No. 13/040,186, filed Mar. 3, 2011.

Notice of Allowance mailed Nov. 26, 2013 in related U.S. Appl. No. 13/121,653, including Examiner's reasons for allowance.

* cited by examiner

METHOD AND DEVICE FOR ELECTRONICALLY CAPTURING A HANDWRITTEN SIGNATURE AND SAFEGUARDING BIOMETRIC DATA

TECHNICAL FIELD

The present invention concerns, in one representative embodiment, a method for electronically capturing a handwritten signature, and preferably for safeguarding a document with at least one inserted signature image and biometric data in a computer apparatus, as well as a correspondingly-operating, computer-based signature system, with which a document can be signed in a biometric-electronic manner so that the document can be provided as secured data with the inserted signature data and may be archived in a manipulation-proof manner.

In particular, the present invention refers to the co-operation between a computer apparatus and a signature capture apparatus which is an individual unit separate from the computer apparatus, but is connected to the computer apparatus and is configured to electronically capture a handwritten signature of the signer and biometric data of the signer's signature.

Moreover, the present invention concerns, in a further representative embodiment, a computer program comprising instructions executable by a computer processor for performing the preceding method.

Finally, the present invention concerns, in a further representative embodiment, a computer-readable medium having instructions stored thereon executable by a computer processor for performing the preceding method.

BACKGROUND OF THE INVENTION

Nowadays, it is becoming increasingly necessary to provide a signed electronic document in a revision-proof manner. A so-called biometric-electronic signature has the advantage that a media breach, i.e. printing out an electronic document on paper for signature, is omitted. Moreover, a biometric feature, such as e.g., a signature, cannot be copied, stolen or forgotten.

The signature is an unambiguous declaration of intent and a long-recognized method for documenting intention. The usual signature method is not changed with the biometric-electronic signature; however, the signer is not required to be a member of a so-called trust center, as is necessary for a digital signature method. Furthermore, the, e.g., handwritten biometric-electronic signature can be examined by a handwriting expert and for example, can also be compared with signatures on paper; the same applies to a biometric-electronic signature using a fingerprint or voice sample, inter alia, whose features can also be examined by recognized experts according to time-tested methods.

For example, the law covering electronic signatures passed in the Federal Republic of Germany regulates the basic conditions for all paperless signature methods, such as e.g., the digital signature, as used in connection with so-called smart cards and the biometric-electronic signatures relevant herein. This law is based upon the EU-Guidelines for electronic signatures and thereby replaces the law covering digital signatures of 1997, which was limited to only Germany. Thus, a European-wide foundation has been created, based upon which products for electronic signature can be employed in a cross-border manner. It can be assumed that the electronic signature will thereby gain a larger foothold in Europe.

Many large companies now produce their internal workflow almost exclusively electronically. However, up to now, the interface to the "outside world"—e.g., outside contractors such as insurance agents, etc.—has remained paper-bound nearly everywhere. Studies have shown that, for every dollar spent on the production of paper, another 30 to 60 dollars are incurred for the further processing thereof. The biometric-electronic signature thus offers companies the possibility of having electronic documents signed electronically instead of on paper.

In spite of substantial efforts, a biometric-electronic signature of an outside person could not, as of yet, be integrated into an electronic workflow without a media-breach using electronic methods. This shortcoming was due to the legal situation, which was applicable until recently, and also to the previous approaches to solving this problem. The electronic signature captures, which were previously known, now allow every end customer to provide an unmistakable declaration of intent without having to possess a special apparatus or certificate; the declaration of intention is directly transferred into an electronic document as a biometric-electronic signature. This form of biometric signature certainly already possesses a high degree of acceptance today (e.g., in the form of handwritten electronic signatures), in particular due to the well-known package delivery services. However, the misgivings relating to improper use and manipulation of signatures, which are utilized for the execution of contracts, etc., are still very high.

Nevertheless, the biometric-electronic signature is increasingly gaining in importance. From a simple document to a complex agreement, the biometric signature can no longer be ignored for everyday matters. However, the precautions for preventing the manipulation of a biometrically-signed electronic document can still be improved.

It has become known in the interim, with the aid of devices for electronically capturing the signature—so-called signature pads (see e.g., DE 10 2006 000 859.6 and the signature pads of StepOver GmbH/Germany offered under the product names: blueMobile Pad, blueMobile Pad LCD, plusPad and plusPad LCD)—, to realize the handwritten electronic signature without a media-breach during the processing of a digital document from the writing thereof until the archiving thereof. Thus, the central aspect of the problem is the unambiguous correlation of a handwritten electronic signature to a document and to a person. It is also known in the interim to make possible an automatic authenticity-check using the captured biometric data from the handwritten electronic signature and thus to almost completely exclude an improper use. However, it has been shown that security can be still further improved to prevent modification and manipulation of a biometrically-signed (e.g., a handwritten signature) electronic document, or to prevent modification and manipulation of the biometrical data. In particular, known signature systems comprising a computer device, e.g., a personal computer, and a signature capture apparatus, e.g. a signature pad, may have the problem that biometrical data representing the signature of the handwritten signature of a signer are not secure during the transfer of the data from the signature capture apparatus to the computer apparatus.

These signature capture apparatus do not have a monitor/screen applicable to display the electronic document to be signed. The reason is that the monitor/screen of the signature capture apparatus has normally not the dimensions applicable to display the document to be signed. The signature capture device or signature pad normally has a screen or monitor with dimensions which are only applicable to show a field or area where the signature has to be made and very limited information can be displayed. The electronic document to be signed is stored on a separate computer apparatus and the signer executing his signature to this electronic document has to rely on that this signature is really used to electronically signing the document shown on a monitor/screen of the separate computer apparatus. Consequently, the split-up of the computer apparatus and the signature capture apparatus may be a source for manipulation of the signature or the electronic document. Furthermore, the signer may hesitate to sign the document which can only be shown on the monitor/screen of the separate computer apparatus and not on the device on which the signer executes his signature.

WO 2006/111979 A discloses a method and apparatus for incorporating a digital signature to within a document for paper-less office. The method comprises generating the document to be signed on a computer and transferring it and displaying it on a device for incorporating digital signature. The device for incorporating the digital signature comprises a screen, signature means such as an electronic pen or finger print capturing device, and at least one smart card reader. Then, the document is being digitally signed. The digitally signed document is being encrypted and transferred to the computer so as to prevent restoration of the digital signature. From the customer side, the procedure is based on "what you see is what you sign". This known method and apparatus requires a special device for incorporating digital signature, namely a device having a screen with dimensions applicable for displaying the documents to be signed. In addition, a smart card reader is necessary.

Another electronic signature management system is disclosed in U.S. Pat. No. 6,307,955 B1. Here, the electronic signature management system includes a graphic tablet digitizer for signaling position coordinates of stylus being moved to produce a hand-written signature, a clock circuit of the digitizer defining a fixed interval between successive stylus position managements measurements, a computer processor electrically interfaced with the tablet and programmed for receiving and storing a multiplicity of the coordinates in sequential order as an electronic signature forming a time history of the stylus movement. The computer is also programmed for verifying the fixed time intervals of the measurements, and for comparing the electronic signature with a reference signature. The electronic signature is preferably encrypted using a hash function or message digits of the document as a key. Also disclosed are methods for electronically signing a document, wherein the electronic signature is electronically bound to the document. The electronic signature is encrypted using a key derived from the document and not saved.

U.S. Pat. No. 7,024,562 B1 discloses a method for carrying out digital signature and a system therefore. In this known method a data packet is sent from a sender to a recipient. The sender and the recipient are connected to a data network via network connection means. A biometric sample of the person is sampled and converted to a digital form. A first digital seal is produced from the combination of the digital data packet and the biometrics sample, or from two or more digital seals derived from the digital data packet and the biometric sample. The digital data packet and the biometric sample and the digital seal are sent to the recipient. A second digital seal is produced from the combinations of received digital data packet and the received biometric sample. The first and the second seals are compared and in the first and second seals are identical, the authentication of the digital signature is approved. Otherwise, the authentication of the digital signature is denied.

A similar method and system is shown in U.S. Pat. No. 5,68,567. Here, a signature object document is hashed to generate a hash sum. The signature image is encrypted with the hash sum generated. Then, the encrypted signature image is encrypted in accordance with the secret information to generate a signature document.

For the sake of clarity, various important terms for the present disclosure are defined as follows:

| | |
|---|---|
| Electronic signature: | reference is made to the corresponding definition in the Guidelines 1999/93/EG of the European Parliament and the European Council concerning the Community Framework for Electronic Signatures, which were published on Jan. 19, 2000 in the Official Journal of the European Community (AB1. L 13 of Jan. 19, 2000, Page 12). |
| Biometric electronic signature: | like an electronic signature, supplemented with an unambiguous biometric identification feature of a person, such as e.g., a fingerprint, a handwritten signature, voice recording, etc., which is securely linked with an electronic data set and/or is inserted therein and is connected by means of a check sum with the data content present at the time point of the signature. |
| Signature image: | a visualization of the signature feature (that is, e.g., the two-dimensional image of a fingerprint, a signature, etc.). |
| Biometric data: | a data set and/or file of a person linked to a feature (such as a fingerprint, a voice recording, a signature, etc.). In contrast to the signature image, biometric data includes, in part, higher resolution and not two-dimensionally depictable information concerning the respective identification feature (e.g., 3-D fingerprint, script image inclusive of writing speed, pressure procession, time of signature, etc.). |
| Signature data: | a data set and/or file and/or data relating to the signature executed by a person, e.g. a combination of the signature image data and the biometric data. |
| Electronic document: | a data set and/or file, which includes data that can be provided or represented in a form readable or understandable by a human using an appropriate device. |

SUMMARY OF THE INVENTION

In a first aspect of the present invention, a method and a device are provided for securely archiving an electronic document, which includes an integrated biometric-electronic signature, and for protecting it against improper use.

Basically, a method according to the present invention comprises providing a computer apparatus configured to store an electronic document signed by a human person, and providing a signature capture apparatus. The signature capture apparatus may be an individual unit separate from the computer apparatus but being connected to this computer apparatus, preferably by a wire, cable or wireless. Connected to may generally interpreted as the two apparatus are communicating with each other. Furthermore, the signature capture apparatus may be configured to electronically capture a hand-written signature of the signer and biometric data of the signer's signature. The signature capture apparatus may be, in addition, be further configured to generate a file including the electronic document and the biometric signature data of the captured signature for this electronic document, and to encrypt said file in the signature capture apparatus for securely transmitting the encrypted file from the signature capture apparatus to the computer apparatus with which the signature capture apparatus is connected.

According to another aspect of the present invention a signature system may comprise a computer apparatus and a signature capture apparatus connected to the computer apparatus. The signature capture apparatus may be formed as a individual unit separate from the computer apparatus but connected with the computer apparatus. The signature capture apparatus is configured to capture a hand-written signature in a digital form and biometric data of the signature. In addition, the signature capture apparatus is configured to generate a file including the electronic document and the signature data of the captured signature. The file may include all necessary information with regard to the electronic document to be signed, the associated signature, the signer's characteristics with respect to his/her signature. In addition, the signature capture apparatus is configured to encrypt that file and to transfer the encrypted file to the computer apparatus with which the signature capture apparatus is connected.

That basic idea guarantees that the signer can be sure that no manipulations can be made on the document signed by the signer and/or with his signature executed for the document already before the file is transmitted from the signature capture apparatus to the computer apparatus with which the signature capture apparatus is connected. Manipulation of the document and/or the biometric data and/or the signature captured may be excluded. Consequently, safeguard of the electronically signed document is improved.

According to another aspect of the present invention, a method for electronically capturing a hand-written signature comprises providing a computer apparatus having a first monitor configured to display an electronic document to be signed by a signer, and providing a signature capture apparatus having a second monitor. The signature capture apparatus may be configured as an individual unit separate from the computer apparatus but being connected to the computer apparatus. The signature capture apparatus may be also configured to electronically capture a handwritten signature of the signer and the biometric data of the signer's signature. According to the present invention a first hash sum of the electronic document to be signed by the signer may be generated within the computer apparatus. Then, the generated first hash sum and optionally the electronic document to be signed by the signer may be transmitted to the signature capture apparatus. The disclosed method may further comprise displaying on the first monitor of the computer apparatus the electronic document to be signed by the signer and the generated first hash sum of the electronic document, and also displaying on the second monitor of the signature capture apparatus the first hash sum transmitted from the computer apparatus. Then, it may follow electronically capturing the handwritten signature of the signer made on the signature capture apparatus thereby generating signature data. The method may also comprise encrypting the signature data and optionally the first hash sum and optionally the electronic document in the signature capture apparatus and transmitting the encrypted signature data and optionally the first hash sum and optionally the electronic document to the computer apparatus. Finally, the method may comprise storing the encrypted signature data and optionally the first hash sum and the electronic document signed on a computer-readable medium.

Such a computer-implemented method for electronically capturing a hand-written signature of an electronic element offers for the first time the advantage that the actual signer and/or an operator/user can never change or manipulate the document or the executed signature, in spite of the fact that the signature and/or the electronically signed document has to be electronically transferred from the signature capture apparatus to the computer apparatus. Despite the fact that the signature capture apparatus may not provide a screen/monitor which is not appropriate to display the document to be signed, but is only appropriate to display where the hand-written signature has to be made on the window/area and to display the first hash sum, the signer can be sure that the document shown on the screen/monitor of the computer apparatus is clearly and unambiguously identical with the document which the signer just signed on the signature capture apparatus which is connected with the computer apparatus. Only in case that the displayed first hash sums on the first and second monitor are identical, the system ensures that the electronic document shown on the first monitor is identical with the electronic document shown on the signature capture apparatus. Due to the fact that the first hash sum is shown on the screen/monitor of the computer apparatus and on the screen/monitor of the signature capture apparatus, the signer can control whether the electronic document displayed on the screen/monitor of the computer apparatus is identical with the document transferred from the computer apparatus to the signature capture apparatus. Only in case that both first hash sums shown on the different screens/monitors are identical, it is guaranteed that the electronic document signed by the signer is the same as displayed on the screen/monitor of the computer apparatus. It has to be noted that the generation of a digital signature image of the captured handwritten signature of the signer and the transmission of this digital signature image to the first monitor of the computer apparatus may be performed independently from the disclosed method including the displaying of the above mentioned first hash sum on the first and second monitors.

Generally, the signature capture apparatus may be very mobile and having a size-format appropriate to put or lay the signature capture apparatus on a desk or somewhere else (or could be hand-held), but despite its small size the signature capture apparatus ensures for a person that the signature executed on the signature capture apparatus is only combined with the electronic document the person intended to sign. Even in case that the screen/monitor of the signature capture apparatus has not an appropriate size for displaying the document to be signed, the signer can be sure that the electronic document displayed on the other screen/monitor of the computer apparatus is being signed.

As according to the present invention the electronic document to be signed, the electronic signature and the associated biometric data of the signature and optionally further signature characterizing information like for example a time stamp of the signature etc. are being bound electronically in the signature capture apparatus before a resulting file is electronically transferred to the computer apparatus with which the signature capture apparatus is connected.

According to an exemplary embodiment of the present invention, the method further comprises generating in the signature capture apparatus a digital signature image of the captured handwritten signature of the signer, transmitting the generated digital signature image to the computer apparatus, and displaying the transmitted digital signature image on the first monitor of the computer apparatus. As a result of these steps the signer may be able to view on the first monitor the image of the signature executed on the signature capture apparatus on the displayed electronic document.

For a fast transmission of the digital signature image of the captured handwritten signature of the signer to the computer apparatus a low resolution raster graphics image, e.g., a low resolution bitmap, may be generated in the signature capture apparatus. Only this low resolution raster graphics image is then transferred to the computer apparatus. As only the low resolution raster graphic image of the signature is transmitted a hacker or Trojan Software will not benefit from getting these data. However, a real-time representation of the signature on the first monitor of the computer apparatus may still be possible. After the signer provided the whole signature a high resolution raster graphics image, e.g. a high resolution bitmap, of the signature may be created to embed this picture into the visible part of the electronic document after transmitting the high resolution raster graphics image to the computer apparatus.

It might be necessary to add a serial number of the used signature capture apparatus to the captured signature in the electronic document so that one can inquire the secret key stored in the signature capture apparatus from the manufacturer of the signature capture apparatus or the person or trust center etc where the secret key is stored, if decrypting of the signature data is later necessary, e.g. in court proceedings or the like.

Another exemplary embodiment of the present invention may further comprise repeating the method steps of the above paragraph during executing the handwritten signature by the signer on the signature capture apparatus with a defined frequency so that the current formation of the handwritten signature can be watched on the first monitor. For example a raster graphics image is generated as a digital signature image in the signature capture apparatus before the raster graphics image is transferred to the computer apparatus. As a result the communication may be very fast and no important information relating to the signature are electronically transferred between the signature capture apparatus and the computer apparatus Another exemplary embodiment of the present invention may further comprise encrypting the first hash sum in the computer apparatus before transmitting the first hash sum to the signature capture apparatus and decrypting the first hash sum in the signature capture apparatus. Thus, the data safety may be improved.

Another exemplary embodiment of the present invention may further comprise encrypting the electronic document to be signed before transmitting it to the signature capture apparatus, and encrypting the electronic document to be signed in the signature capture apparatus. Thus, the data safety may be even more improved.

According to another exemplary embodiment of the present invention a first unique key is electronically stored on the signature capture apparatus. On the basis of this first key safety of encryption of the signature data etc. in the signature capture apparatus may be improved. Preferably, the first unique key is generated at random and stored in an inaccessible manner in the signature capture apparatus during the manufacturing process of the signature capture apparatus. Thus the data safety and safety of the encryption may even more improved. Preferably a copy of the first unique key is stored at a secure location separate from the signature capture apparatus, e.g. at a notary. In case that the signed electronic document has to be decrypted the copy of the first unique key can be used. Due to this first unique key representing only one single signature capture apparatus of a series of signature capture apparatus not all signature capture apparatus of the series become unsecure if the encryption key, i.e. the first unique key of this one single signature capture apparatus, will become public because of, e.g., a Trojan Software or hacker. For example, this first unique key may not be changeable by the signer or user of the signature capture apparatus or by Trojan Software. The first signature key will be only provided from the manufacturer to an expert who is able to decrypt the signature data of an electronic document in case of court proceedings to enable the expert to prove the handwritten signature inside this signed electronic document. Therefore, it is preferred that the manufacturer of the signature capture apparatus stores the encryption key, e.g. the first unique key, for each signature capture apparatus in a secured, preferably encrypted manner so that only the manufacturer or a notary etc. is able to provide an expert with this unique key.

According to another exemplary embodiment of the present invention for each signature capturing process a random value is generated in the signature capture apparatus. The generated random value may replace the static first unique key mentioned herein. Then, the encryption of at least the signature data may be performed as disclosed.

According to another exemplary embodiment of the present invention a second unique key is generated in the signature capture apparatus by combining the first unique key and the first hash sum generated, the second unique key being used for encrypting the signature data and optionally the first hash sum. Thus, the data safety and safety of the encryption can be improved.

According to another exemplary embodiment of the present invention the disclosed method further comprises generating a second unique key in the signature capture apparatus by combining the first unique key and the first hash sum generated in the signature capture apparatus, generating a second hash sum of the second unique key generated in the signature capture apparatus, using the generated second hash sum of the second unique key for encrypting the signature data and optionally the first hash sum. Thus, the data safety and safety of the encryption can even be more improved.

As mentioned above, the captured signature data are transferred after encryption from the signature capture apparatus to the computer apparatus. For improving data security the encrypted data transferred to a computer apparatus may contain the hash sum in some random packages, i.e. that the encrypted signature data is mixed together with the first hash of the electronic document, and can only be isolated if one is able to decrypt the data.

Another exemplary embodiment of the present invention may further comprise repeating one or more of the above-mentioned method steps as to capture a plurality of handwritten signatures executed by several signers on the signature capture device.

Another exemplary embodiment of the present invention may further comprise displaying the electronic document on the first monitor and activating an electronic lock so that the displayed electronic document cannot be amended anymore after it is displayed on the first monitor.

Another exemplary embodiment of the present invention may further comprise generating the first hash sum after the electronic lock has been activated. Thus, data safety may be improved.

According to another exemplary embodiment of the present invention may further comprise a third unique key, preferably a unique serial number of the signature capture apparatus, is stored together with the encrypted signature data and the signed electronic document.

According to another exemplary embodiment of the present invention, the signature data may comprise at least the coordinates of the signature made on a signature capture window in a predetermined resolution and in a preset coordinate system, and the biometric data may comprise at least on of the group consisting of: pressure procession data of the signature made by the signer in a predetermined resolution and in a preset pressure range, a time period data representing the time period of the signature made by the signer in a predetermined resolution and in a preset time range and with reference to a preset coordinate system, a fingerprint data representing a captured fingerprint of at least one finger of a predetermined hand of the signer in a predetermined resolution and in the preset coordinate system, handprint data representing a captured handprint of a predetermined hand of the signer in a predetermined resolution and in the preset coordinate system, facial data representing at least certain facial features of the signer in a predetermined resolution and in the preset coordinate system, voice data representing a voice sample of the signer in a predetermined resolution, and eye data representing at least certain areas of at least one of the iris and the retina of a predetermined eye of the signer in a predetermined resolution and in the preset coordinate system.

In a second aspect of the present invention, a signature system for electronically capturing a handwritten signature comprises a computer apparatus and a signature capture apparatus. The signature capture apparatus may be a unit separate from the computer apparatus but connected with the computer apparatus via cable, wire or wireless. The computer apparatus comprise a storage device configured to store at least an electronic document to be signed, a first data processing device configured to generate a first hash sum of the electronic document to be signed by the signer, a first monitor configured to display the electronic document to be signed by a signer and the first hash sum of the electronic document to be signed by the signer, and a first input/output interface electrically connected with a separate signature capture apparatus and configured to transmit at least the first hash sum of the electronic document to be signed by the signer to the signature capture apparatus, and configured to receive data from the signature capture apparatus. The signature capture apparatus may be connected with the computer apparatus via the first input/output interface. The signature recording apparatus have a signature capture window configured to capture a signature made thereon using a writing implement, and biometric data of the signer's signature, a second monitor configured to display the first hash sum transmitted from the computer apparatus, a second data processing device configured to encrypt the captured signature data and optionally the first hash sum, and a second input/output interface electronically connected to the second monitor and the second data processing device and configured to transmit the encrypted signature data and optionally the first hash sum to the computer apparatus.

According to another exemplary embodiment of the present invention the signature capture apparatus is configured such that a digital signature image of the captured handwritten signature of the signer is generated and transmitted to the computer apparatus, and the computer apparatus is configured such that the transmitted digital signature image is displayed on the first monitor of the computer apparatus.

According to another exemplary embodiment of the present invention the first input/output interface and the second input/output interface are configured such that the digital signature image of the captured handwritten signature of the signer is being repeatedly displayed on the first monitor of the computer apparatus during the executing of the signature with a defined frequency.

According to another exemplary embodiment of the present invention the signature capture apparatus is configured such that a raster graphics image of the handwritten signature is being generated as a digital signature image with the defined frequency.

According to another exemplary embodiment of the present invention the computer apparatus is configured to encrypt the first hash sum of the stored electronic document and to transmit the encrypted first hash sum to the signature capture apparatus, and the signature capture apparatus is configured to decrypt the encrypted first hash sum transmitted from the computer apparatus. Thus, data safety may be improved.

In another exemplary embodiment of the present invention a first unique key is electronically stored in the signature capture apparatus in an inaccessible manner, the unique key being configured to be used for encrypting the signature data and optionally the first hash sum. Again, the data safety may be improved.

According to another exemplary embodiment of the present invention the signature capture apparatus further comprises a random value generator configured to generate a random value, and the second data processing device being configured to encrypt the captured signature data and optionally the first hash sum by using the generated random value. In this exemplary embodiment the generated random value may also replace the "static" unique key stored in the signature capture apparatus. The further encryption steps may be performed as described herein. In case a random value is used instead of the "static key" stored in the signature capture apparatus a problem may arise if later a signed electronic document has to be decrypted (as the necessary information, here the random value, is not known). Therefore, the random value may be send to the computer apparatus. For safety reasons, the random value may be encrypted on the signature capture apparatus and then send to the computer apparatus. The used encryption is preferably a asymmetric encryption, wherein the public key is stored in or transferred to the signature capture apparatus and the private key is deposited at a secure location, e.g. a notary.

According to another exemplary embodiment of the present invention the signature capture apparatus is configured to generate a second unique key by combining the first unique key (which may be replaced by the above-mentioned random value) and the first hash sum. The signature capture apparatus may be further configured to generate a second hash sum by hashing the second unique key, and to encrypt the signature data and optionally the first hash sum by using the generated second hash sum. Due to the fact that in this exemplary embodiment a new unique key is generated which key is unique for each signing procedure, the data security may be even better improved.

In addition, the invention concerns various computer programs, which comprise instructions executable on a computer system, which instructions result in that the computer system executes one of the disclosed methods.

Finally, a further aspect of the present invention comprises a computer-readable medium having instructions thereon, which are executable by a computer and cause the computer to execute one of the disclosed methods.

It has to be noted that the invention as disclosed may also comprise only a combination of features of one or more of the dependent claims, i.e. a method and system which do not include the steps of displaying the hash sum on the first and second monitors.

BRIEF DESCRIPTION OF THE DRAWINGS

In the following, a plurality of embodiments of the present invention are described in detail with reference to the attached drawings for further explanation and better description. It should be noted first that the apparatus shown in the drawings are not in scale and that the apparatus in the drawings are not drawn in proportion to one another.

DETAILED EXPLANATION OF THE EXEMPLARY EMBODIMENTS OF THE PRESENT INVENTION

Figure 1:
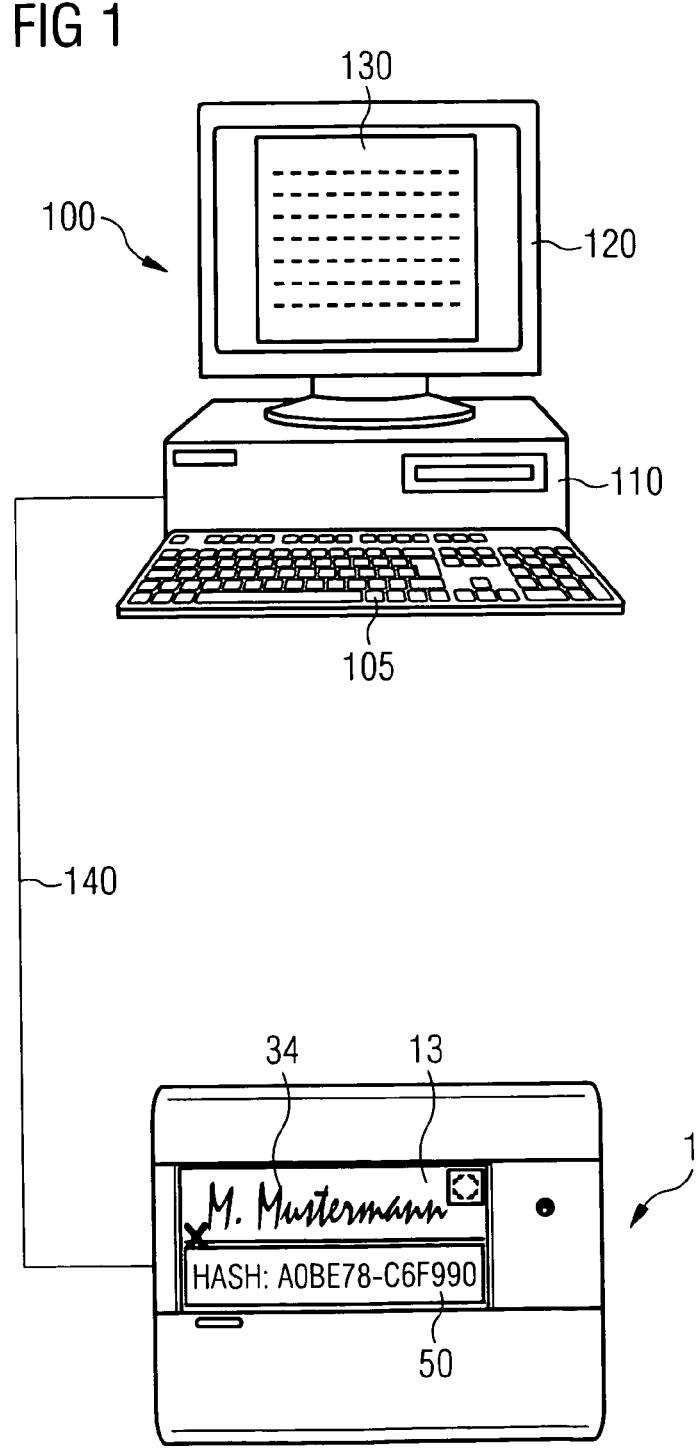
FIG. 1 shows a schematic diagram of a computer system according to an exemplary embodiment of the invention, wherein the computer system comprises a computer apparatus and a signature capture apparatus.

FIG. 1 shows a schematic diagram of a computer system according to a first exemplary embodiment of the present invention. The computer system may comprise a computer apparatus 100 and a signature capture apparatus 1. The computer apparatus 100 may be separate from the signature capture apparatus 1. In the present exemplary embodiment of the present computer system, the computer apparatus 100 is an individual unit separate from the signature capture apparatus 1. However, signature capture apparatus 1 is connected with the computer apparatus 100 via, e.g., a wire or cable 140. The cable 140 may be replaced by a wireless connection.

The computer apparatus 100 may comprise a computer terminal 110, a monitor 120 and an input device 105, e.g. a keyboard. The monitor 120 and the keyboard 105 may be connected with the computer terminal 110 including all necessary elements of a usual computer like a processor input/output interface etc. The monitor 120 may be replaced by any other known displaying device like a LCD screen and so on. The monitor 120 has an appropriate size to display an electronic document 130 to a signer.

The signature capture apparatus 1 connected with the computer apparatus 100 may be formed as a separate unit and having a size and dimensions so that the signature capture apparatus 1 can easily be handled, e.g. hand-held, by a user and/or put or laid on a desk or the like where a signer can execute his signature on the signature capture apparatus 1 in a position convenient for the signer, preferably independent from the normally larger computer apparatus 100. The signature capture apparatus 1 may comprise a window 13 on which the signer can execute the with a writing pen etc. the signature on the electronic document 130 which document 130 is shown on the screen 120 of the computer apparatus 100.

The special design of the signature capture apparatus 1 may result in an area or window 13 on which a signer can execute the signature, but the electronic document cannot be displayed. Consequently, the special design may lead to the above-mentioned problem that the signer is not absolutely sure that the signature 34 will really bind to only the document 130 displayed on the monitor 120 of the computer apparatus 100.

The special design and cooperation of the signature capture apparatus 1 and the computer apparatus 100 according to the exemplary embodiment of the computer system may improve the security for a signer that in fact the electronic document 130 displayed and viewable on the screen or monitor 120 of the computer apparatus 100 is identical with the document to be signed with his signature 34 to be executed on the window 13 of the signature capture apparatus 1. For this reason the computer apparatus 100 is configured to generate a first hash sum of the electronic document 130 to be signed. Preferably, the computer apparatus 100 is configured such that as soon as the electronic document 130 is displayed on the monitor 120 of the computer apparatus 100 an electronic lock implemented in a program or software is actuated so that the electronic document 130 to be signed cannot be amended anymore. At the same time or afterwards the first hash sum of the electronic document 130 is generated, the first hash sum is transmitted via the cable 140 to the signature capture apparatus 1. Preferably, the first hash sum is encrypted in the computer apparatus 100 before it is transmitted to the signature capture apparatus 1. In this case, it is secured that a manipulation of the first hash sum or other data sent from the computer apparatus 100 to the signature capture apparatus 1 is prevented.

More preferably, not only the first hash sum is encrypted but also the electronic document 130. The encrypted first hash sum and the encrypted electronic document 130 are received from the signature capture apparatus 1. At least the encrypted first hash sum is decrypted in the signature capture apparatus 1 and displayed on the window 13 of the signature capture 1. The first hash sum is also displayed on the monitor 120 or screen of the computer apparatus 100.

Because the signer can now compare the displayed first hash sums on the window 13 of the signature capture apparatus 1 and the screen 120 of the computer apparatus 100 the signer has the possibility to check whether the electronic document 130 displayed on the screen 120 of the computer apparatus 100 is in fact the document which the signer intends to sign by executing his hand-written signature 34 on the window 13 of the signature capture apparatus 1. Hence, if the displayed first hash sum, i.e. the image 50 on the window 13 of the signature capture apparatus 1, is identical with the first hash sum, i.e. the image 135 displayed on the screen 120 of the computer apparatus 100, the signer knows that the electronic signature 34 relates only to the electronic document 130 displayed on the screen 120 of the computer apparatus 100.

During the execution of the signature on the signature apparatus 1 biometric signature data are generated. These biometric signature data include, e.g., various characterizing elements. The signature data are then encrypted and sent via the cable 140 to the computer apparatus 100. Preferably, the signature data and the electronic document 130 may be combined and encrypted already on the signature capture apparatus 1. Then the encryption of this file will follow and the encrypted file which may include the encrypted signature data and the electronic document is send to the computer apparatus 100.

In a preferred embodiment of the present invention the electronic document to be signed is already being joined with the digital signature and the corresponding biometric data. Then this file is being encrypted in the signature capture apparatus 1 before it is transmitted from the signature capture apparatus 1 to the computer apparatus 100. That procedure ensures that a manipulation of the digital signal and its biometric data and/or the electronic document is not possible. Even an operator of the computer apparatus 100 can not manipulate these data.

The encryption is preferably an asymmetrical encryption. Alternatively, the encryption may be a symmetrical encryption.

More preferably, the encryption procedure is as described in U.S. Ser. No. 11/964,293. This reference is incorporated herein in its entirety by reference. Preferably, the asymmetric encryption is used for encrypting the data and/or file(s) in the computer apparatus. However, the asymmetric encryption may also be used for encrypting the data and/or file(s) in the signature capture apparatus.

Figure 2:
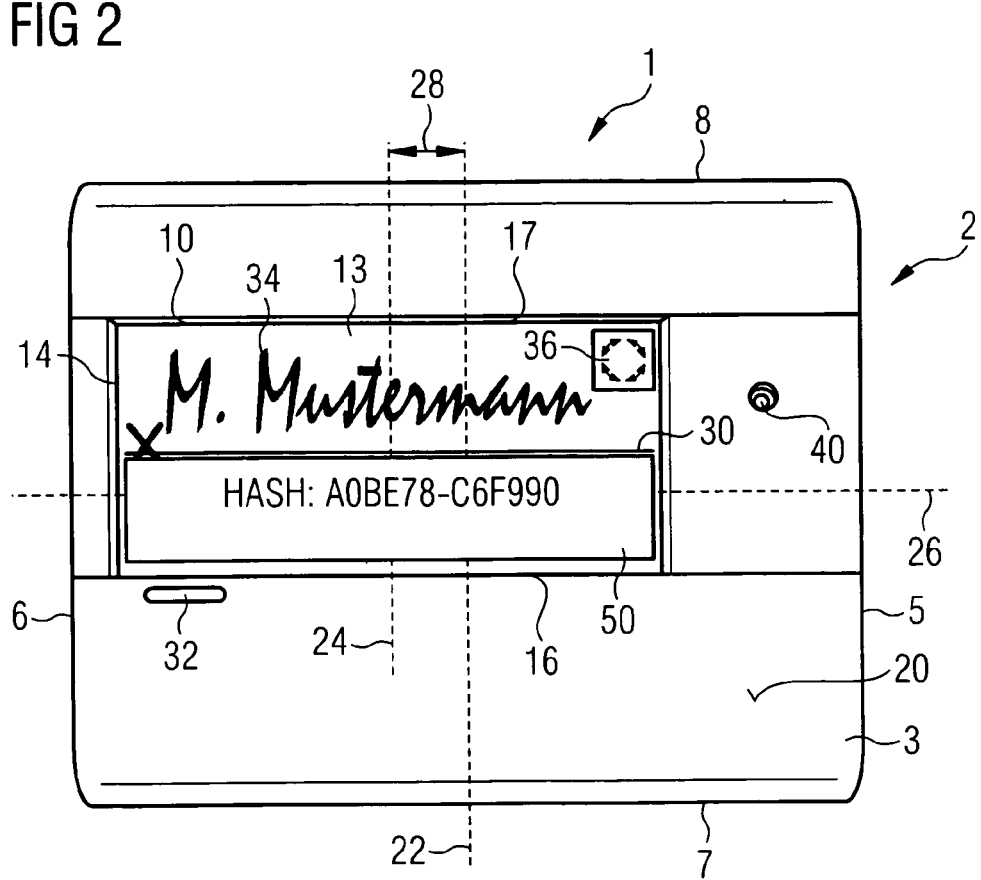
FIG. 2 shows a top view of the signature capture apparatus for electronically capturing a handwritten user input, such as e.g., a signature, which may be used in a computer system shown in FIG. 1.

The plan view of FIG. 2 shows a first exemplary embodiment of the representative signature capture apparatus 1 configured to electronically capture or record a handwritten user input, such as e.g., a signature. The device 1 preferably comprises an essentially rectangular or quadratic housing 2, which is comprised of a front housing part 3 and a rear housing part 4. However, other shapes for the housing 2 are, of course, possible based upon the intended application for the present teachings. A generally rectangular opening or cut-out 10 is located in the front housing part 3. An input field 13 is located in and/or under the rectangular opening 10. A handwritten user input, e.g., a signature 34, can be made on the input field 13 using a pen or stylus (not shown).

In the depicted plan view, the housing 2 has a right edge 5, a left edge 6, a lower edge 7 and an upper edge 8. The nomenclature for these edges 5-8 of the housing 2 can also be utilized as such for the edges of the rectangular opening 10.

The input field 13 may have a known construction so that, generally speaking, no further explanations are necessary for the construction and the operation thereof. For the sake of good order, reference is made to previous publications of StepOver GmbH, Germany, which markets so-called signature pads having a corresponding input field, e.g., under the trademarks: blueMobile Pad, plusPad, blueM Pad and +Pad II/III.

The input field 13 can be embodied in the form of a touch device or touch screen, e.g., an LCD touch screen, which is actuatable using a pen (not shown). With such a signature capture apparatus 1, it is also possible to capture the coordinates of the script and/or the signature 34 as the input is being made on the touch device 13 and/or to capture the amount of pressure applied at each coordinate or position on the touch screen over the course or progression of the handwritten input. The signature 34 or other handwritten input is then available in the form of an analog or digital data record.

In addition, a real-time clock can be integrated into the signature capture apparatus 1, so that a time stamp generated by the real-time clock can be correlated with each captured data record of the script coordinates and/or the captured data record of the course of applied pressures. Preferably, an indication code is added to each captured data record of the script coordinates and/or the captured data record of the course of applied pressures. The identification code is preferably individualized for the signature capture apparatus that was utilized for the capture of the handwritten input. This identification code can be stored in a memory chip, which may preferably be a ROM or other semiconductor memory that is disposed in the housing 2. A further improvement of the data security is achieved by having a processor disposed in the housing 2 generate a process identification code individualizing the input for each user input and by adding this code to the data record of the script coordinates and/or the data record of the course of applied pressures. Reference is made to the disclosure of DE 10 2006 000 859.6 for further details, which is incorporated herein by reference.

As is apparent in FIG. 2, the input field 13 is eccentrically or asymmetrically positioned relative to the housing 2, i.e. relative to the outer edges 5-8 of the housing 2. In the present embodiment, the distance between the left housing edge 6 of the housing 2 and the left edge 14 of the input field 13 is less than the distance between the right housing edge 5 of the housing 2 and the right edge 15 of the input field 13. As a result of this particular arrangement, it is possible for a right-hander to make or write an input 34 on the input field 13 using the pen 33 with the hand and forearm in a comfortable, natural position while entering the handwritten input, if the user rests at least a part of the hand, which is holding the pen 33, on the portion of the front housing part 3 forming a hand-resting surface 20. This hand-resting surface 20 is the area between the lower edge 16 of the input field 13 and the lower housing edge 7 of the housing 2. The offset of the input field 13 is clearly shown in FIG. 1 as the distance 28 between the middle line 22 of the housing 2 and the middle line 24 of the input field 13.

The readiness-for-operation of the signature capture apparatus shown in FIGS. 1 and 2 may be indicated, e.g., by a LED-lamp 32, which may be a horizontal, oblong element located in the left, lower portion of the housing 2. This LED-lamp 32 can illuminate, e.g., green, when a signature is to be captured, and can be illuminated orange/yellow, when the readiness-for-operation is to be indicated. The LED-lamp 32 may also illuminate red when a malfunction is present.

The electronic current is supplied to the signature capture apparatus shown in FIG. 1 via the cable 140 that leads and/or penetrates through one edge 5-8 of the housing 2. Optionally, a cable-less design is also possible. In this case, the energy is supplied by batteries or an accumulator (e.g., rechargeable battery).

As shown in FIG. 2, an insertion opening 40 is provided in the housing 2 between the right housing edge 5 and the right edge 15 of the input field 13. The tip of the pen is insertable into the insertion opening 40. Thus, the pen can be stored, ready-for-use, in a convenient way. In order to prevent the pen from being lost, an accommodation opening having a cavity with a length substantially equal to the length of the pen is also provided in the left, upper edge portion of the housing 2. The pen is nearly completely insertable into the accommodation opening/cavity, so that only the rear end of the pen protrudes from the opening.

In both of FIGS. 1 and 2, the input field 13 includes a signature line 30, on or above which the signature 34 can be made by a user via a pen or stylus. The signature 34 is preferably displayed on the screen or display disposed under the transparent input field 13 (e.g., using 'electronic ink', i.e. the display is electronically actuated to show the signature on the display) in real-time while the signature is being made. Furthermore, a special symbol 36 is displayed in the input field 13, preferably in the right, upper corner according to the illustration of FIG. 2. The signature capture apparatus 1 is preferably configured or programmed such that, when the user taps or touches the symbol 36 using the pen, the signature capture apparatus 1 takes into consideration, during the capture of the handwritten input, that the signature 34 is being made on the input field 13 with the housing 2 rotated by 180°. That is, the handwritten input is being made by a user, who is left-handed.

In the rotational position or orientation of the signature capture apparatus 1 suitable for a left-hander, the hand-resting surface 20 is oriented at the top in the plan view and the input field 13 is disposed in the right, lower corner of the housing 2. As a result, a left-hander can execute a signature 34 on the input field 13 in a natural position or posture for the left hand. By tapping the symbol 36, the signature capture apparatus 1 is adapted to display the signature line 30 in the position shown in FIGS. 2 and 5, i.e. along the lower edge of the input field 13. Further, the symbol 36 is then displayed in the left, upper corner of the input field 13. If a right-hander then intends to sign again after the left-hander has signed, the symbol 36 is again tapped and the housing 2 is rotated, so that the signature capture apparatus 1 again assumes the position shown in FIGS. 1 and 2. Then, the signature 34 can again be made by a right-hander.

As is illustrated in FIGS. 1, and 2, the input field 13 is eccentrically or asymmetrically located relative to the edges 5-8 of housing 2. In particular, the plan view of FIG. 2 shows that the line of symmetry 22, which separates the housing 2 into two equal halves, lies at a distance 28 from the line of symmetry 24 of the input field 13. The lateral offset 28 of the input field 13 relative to the line of symmetry 22 of the housing 2 preferably amounts to, e.g., about 20-40 mm, more preferably about 30 mm.

In the embodiment shown herein, the signature capture window 13 is constructed so that the signature 34 can be made on it with a writing implement in the usual way like on a sheet of paper. In this embodiment, the pressure applied to the signature capture window 13 when making the signature 34 using the writing implement and the time period are detected in addition to the signature image. Detection devices for the pressure detection and for the detection of the time period, which are necessary therefor, are contained in the housing 8 of the signature capture apparatus 1 and are well-known, so that they need not be discussed in detail.

In the embodiment of the invention shown herein, additional detection devices (not shown) may are also integrated in the signature capture apparatus 1, with which the following bodily features of the signer can be detected:

fingerprint capture device, with which the fingerprint of at least one finger of a predetermined hand of the signer, who has made the signature 34, is captured in a predetermined resolution in a preset coordinate system (x, y), handprint capture device, with which the handprint of a predetermined hand of the signer, who has made the signature 34, is captured in a predetermined resolution in a preset coordinate system x, y, face capture device, with which at least certain facial features of the signer, who has made the signature 34, are captured in a predetermined resolution in a preset coordinate system x, y, voice sample capture device, with which a voice sample of signer, who has made the signature 34, is captured in a predetermined resolution, and iris- and/or retina capture device, with which at least certain areas of the iris and/or the retina of a predetermined eye of the signer, who has made the signature 34, are captured in a predetermined resolution in a preset coordinate system (x, y).

In addition to the above-noted detection devices and the data relating to persons obtained thereby, an identity number individualizing the signature capture device can also be consigned in the device, which identity number is transmitted together with the captured data.

Figure 3:
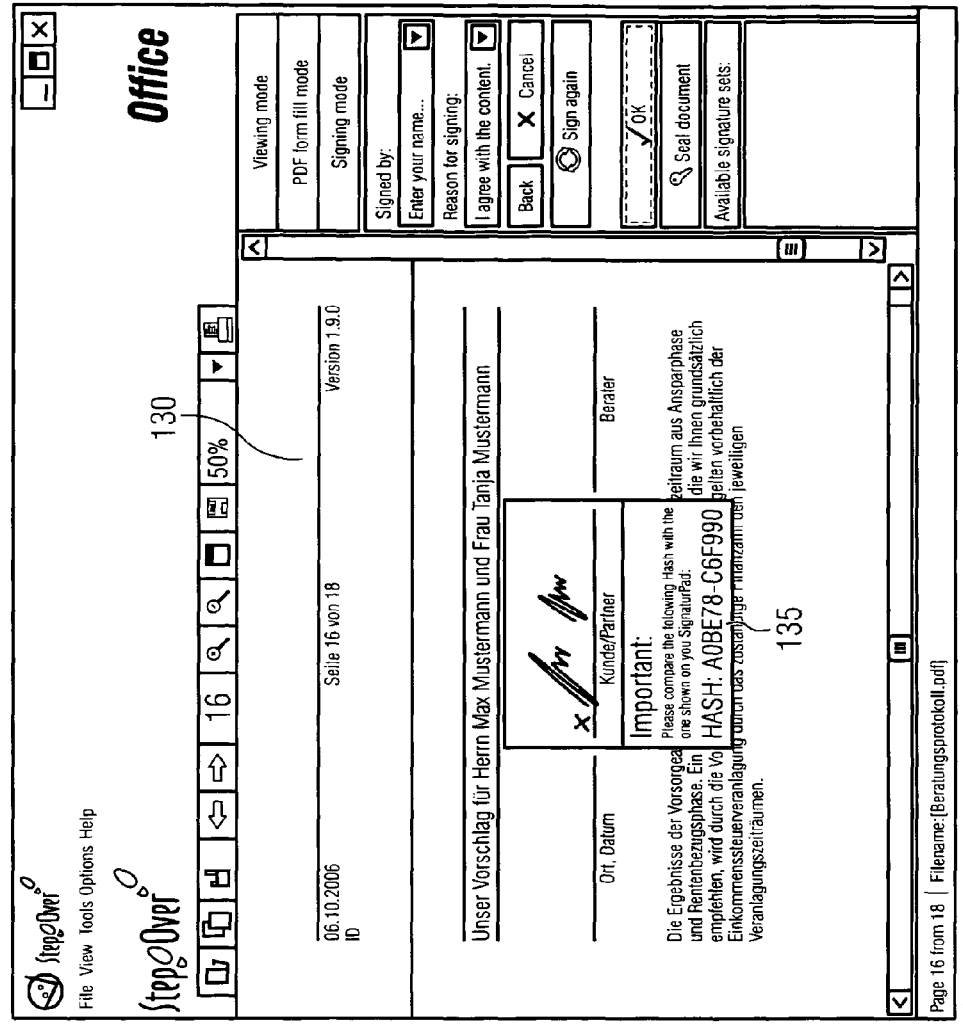
FIG. 3 shows a part of a monitor/screen of a computer apparatus, on which monitor a part of an electronic document to be signed by a signer is shown.
Figure 4:
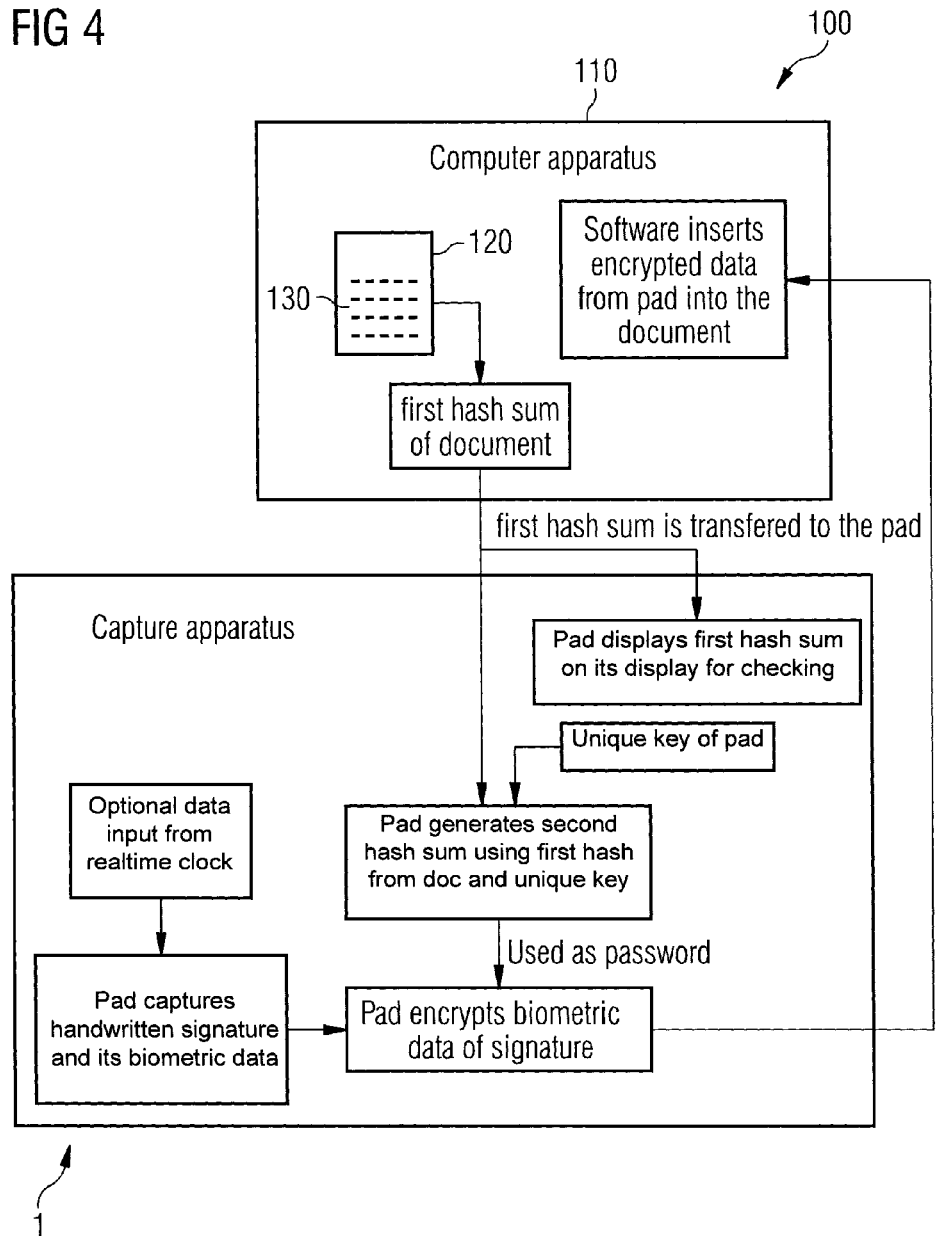
FIG. 4 shows a schematic diagram of the computer system shown in FIG. 1-3 for illustrating some method steps of an exemplary embodiment of the present inventive method.

FIG. 4 shows a schematic diagram of the computer system shown in FIGS. 1-3. Here, the computer apparatus 100 is configured to generate the hash sum of the electronic document 130 displayed on the monitor 120. The hash sum of the electronic document 130 to be signed by the signer is transferred to the signature capture apparatus 1. As already mentioned above, the hash sum may be encrypted in the computer apparatus 100 before it is transferred to the signature capture apparatus 1. In the signature capture apparatus 1 (signature pad) the hash sum is decrypted, if necessary. Furthermore, the decrypted hash sum is displayed on the window 13 of the signature capture apparatus 1. The shown signature capture apparatus 1 of FIG. 4 may comprise a storage device in which a first unique key is stored. The first unique key represents the present signature capture apparatus 1 only (e.g. a unique serial number).

The signature capture apparatus 1 of FIG. 4 is configured to generate a second unique key by combining the first unique key and the first hash sum. In addition, this signature capture apparatus 1 is configured to generate a second hash sum by hashing the second unique key. Furthermore, the signature capture apparatus 1 of FIG. 4 is configured to encrypt the signature data and optionally the first hash sum by using the generated second hash sum.

The encrypted signature data and/or the first hash sum are then transferred to the computer apparatus 100. In this computer apparatus 100 software is being executed to insert the encrypted data received from the signature capture apparatus 1 into the signed electronic document 130.

Afterwards, the signed electronic document with the encrypted data received from the signature capture apparatus 1 are encrypted by symmetrical or asymmetrical encryption, in particular by an encryption as mentioned below and/or as described in U.S. Ser. No. 11/964,293.

For the sake of good order, it is noted that an inventive signature capture apparatus must only be configured, if desired, to detect one of the mentioned features or combinations of some lesser number of biometric features. In this respect, a fingerprint scanner is also to be regarded as an inventive signature apparatus, which fingerprint scanner captures the biometric data of a fingerprint in sufficient quality, safeguards (i.e. transmits in an encrypted manner) it and also sends an ID with it, which later permits conclusions to be drawn about the signature apparatus (i.e., e.g., the fingerprint scanner).

In the embodiment of an inventive signature system depicted in FIG. 1, the signature apparatus 1 is connected with the computer apparatus 100 via the cable 140. The above-mentioned biometric data captured when executing the signature 34 using the writing implement are transmitted to the computer apparatus 100 via the cable 140 for further processing and handling. Incidentally, it is noted that data can be transmitted via the cable 140, e.g., also from the computer apparatus 100, such as for example the document 130 to be shown in the display 120. The communication of the signature capture apparatus 1 with the computer apparatus/data processing device 100 takes place in a secure manner (i.e. encrypted).

The computer apparatus 100 comprises a housing 110, in which various devices are housed. Thus, a storage device is provided, in which the document 130 and the associated signature data are stored. The signature data herein comprise at least the data of the signature image 34 in a predetermined resolution with reference to a predetermined coordinate system x, y for the case of the biometric capture of the handwritten signature in the signature capture window 13.

Further, a first check sum generating device is provided, which is constructed such that a first check sum for the document 130 and attachments, which will be explained below, is generated using a predetermined first hash function. A second check sum generating device is constructed such that a second check sum for the document 130 and attachments, which will be explained below, is generated using a predetermined second hash function. A third check sum generating device is constructed such that a third check sum for the document 130 and the signature image 34 inserted into the document 130, as well as optionally-provided additional attachments, is generated using a third hash function.

A further component of the computer apparatus 100 is a real random number generator, with which random values are generated. This random number generator supplies a random value to a symmetric encryption device that is also a part of the computer apparatus 100. This symmetric encryption device is constructed for the purpose of symmetrically encrypting the biometric signature data and the first check sum. The key used herein is thus formed by the sum of the second check sum and the generated random value.

Finally, an asymmetric encryption device is provided, which is constructed for the purpose of asymmetrically encrypting an overall check sum with a second private key of a second key pair. This second key pair is comprised of the second private key and an associated second public key.

A further component of the computer apparatus 100 is an output interface, to which the document 130 having an inserted, visible signature image and invisible attachments, which will be explained below, is provided. Thus, the document 130 having the inserted, visible signature image and the invisible attachments, which are attached to the document 130, can then be sent to an addressee, such as a company, via a connector of the output interface and e.g., via a world-wide network, such as the Internet.

The basic process flow of a first embodiment of a method is shown for safeguarding a document 130 with an inserted signature image. Thus, for example, the method is started by turning-on the signature capture apparatus 1. The signature apparatus 1 is thereby ready to capture the signature and/or biometric data of a signer using the writing implement on the signature capture window 13. At the same time, in accordance with the first step of the inventive method, the document 130 can be provided as a data set in a particular data format (for example, as a PDF data set, Word data set, TIFF data set, JPG data set, wave, mp3, divx, avi, etc.) and can be displayed in the display 130 of the computer apparatus 100. As soon as the signature has been made in the signature capture window 13 of the signature apparatus 1 using the writing implement, the captured biometric data are provided as a digital signature image.

As was already mentioned, additional biometric data can also be captured, depending upon how the signature capture apparatus 1 is equipped, in addition to the actual signature image with the associated biometric data in a particular resolution and in a particular coordinate system, so that later a plurality of identification features of the signer or also different identification features of different signers can be inserted into the document. These are, e.g., the pressure procession and the time period. These biometric data may be treated as separate data units (data streams).

If the signature process is correctly executed, the signature image is visibly inserted into the document 130 in the next method step. If provided, the biometric data are invisibly attached to the document 130 as data block. In this method step, different check sums are also generated and different encryptions are performed. These method steps will be described in more detail below.

It is asked whether the document 130 is still to be signed by other people, i.e. whether additional signature images and the associated biometric signature data are to be integrated therewith. If this is the case, the process returns to the beginning and the above-described procedure is carried out for the second to the nth signature. If no further signatures are to be integrated, then the process proceeds to a next step. Here it is asked whether an additional key pair II is configured. If this is not the case, then the signed document 130 with the signature image inserted therein and the optionally-provided biometric signature data, which were attached as data block, as well as additional attachments that will be described below, is output.

If a key pair II is configured, then it is continued to a next step. A signed document 130 with the inserted signature image having specially-encrypted attachments is provided and/or is output.

The document 130 can be readably and/or audibly represented and/or can be printed on a not-shown display or other output medium using a data processing program corresponding to the particular type of data (such as, e.g., Microsoft Word). Optionally-provided biometric signature data are attached to the document 130 as an invisible data unit.

In a method step, a first check sum for the document 130 with the inserted signature image and, if provided, inclusive of the attached biometric data, is generated using a first hash function. A second check sum for the document 130 with the inserted signature image (but not for the invisible attachments) is now generated using a predetermined second hash function. This second hash function preferably is identical with the first hash function, but it can be selected from various hash functions implemented in the apparatus according to the circumstances of the user of the inventive signature system.

A random value is then generated using the real random number generator and then a symmetric encryption of the first check sum and, if provided, the biometric data, together with the check sum is performed. The key for this symmetric encryption is the sum of the second check sum and the just-generated random value. The symmetrically-encrypted attachment (symmetrically-encrypted first check sum and/or symmetrically-encrypted first check sum and biometric data) is then invisibly attached to the document 130 with the inserted signature image. In other words, the first check sum and, if provided, the biometric signature data, are encrypted together symmetrically in a data stream by performing a symmetric encryption using a key generated from the second check sum and a random value. In the present case, a 448 Bit Blowfish-encryption has been selected. However, other types of symmetric encryption can also be utilized.

For the sake of good order, it is also noted that there is only one symmetrically-encrypted data block that contains either only the check sum or the check sum and the biometric data. If the biometric data has been put in an extra encrypted block, then these, i.e. without the encrypted check sum, would be individually removable from the data set.

The above random value, with which the symmetric encryption was performed (as a part of the encryption password), is also asymmetrically encrypted in another method step. The key for this asymmetric encryption is a first public key of a first key pair, which is comprised of a first private key and the associated first public key. The first private key can, for example, be consigned to a notary. The outside contractor and company using the inventive signature system should, as much as possible, have no access to this private key of the first key pair, in order to ensure that neither the outside contractor nor the company can themselves alter the document 130 with the inserted signature image and the invisible attachments. The public key of this first key pair is consigned in the disclosed signature system in a simple way. For example, it can be stored in the storage device of the computer apparatus and/or the signature capture apparatus.

The asymmetric encryption relates to a PKI-encryption. Other asymmetric encryptions could also be utilized. The asymmetrically-encrypted random value may also invisibly attached to the document 130 as attachment. Thus, a document 130 provided with the signature image is now available. The first check sum and, if provided, the biometric signature data, which were symmetrically encrypted by performing a symmetric encryption using the special key generated from the second check sum and a random value, are attached to the document 130 as invisible attachments. Moreover, the asymmetrically-encrypted random value, which is a part of the key for the encryption of the second check sum and the biometric signature data, is invisibly attached to the document 130 as an attachment.

The fundamental principle of an inventive method for safeguarding a document 130 with inserted signature image in a signature capture apparatus 1 is thereby concluded. The document 130 protected and safeguarded thereby with the inserted signature image and the additional encrypted attachments can now be output via an interface of the signature capture apparatus 1 A practical usage situation of the inventive method can, e.g., be comprised in that an outside contractor has an insurance contract signed by the to-be-insured person using the signature capture apparatus 1. The electronically-captured signature 34 and the optionally-provided additional biometric signature data are then transmitted via a connector, e.g., to the computer apparatus 100 of the insurance agent and encrypted there according to the previously-explained procedure and thereby protects it from unauthorized access. This type of protected document 130 with the attachments and the inserted signature 34 is then transmitted via an interface and the connector and a not-shown communication path, such as e.g., the Internet, to the, e.g., insurance company. The inventively-safeguarded document 130 and the attachments protected from alterations can be archived there.

The first private key belonging to the first public key of the first key pair, with which a decoding of the attachment and thereby, if applicable, the attachments would be possible, is normally not available to the business company, but rather is consigned to a notary. The same also applies, of course, for the employee, who took part at the signature capture. Thus, in case of a dispute, it can not be imputed that the business company or the participating employee manipulated the disputed document 130 and/or the invisible attachments.

It is thus a problem that, in this case, the company or generally the user of the inventive signature system has no possibility for self-checking the data integrity of the document 130 with the inserted signature 34.

A first overall check sum for the document 130 with the signature inserted therein and the invisibly-added attachments is generated using a predetermined third hash function. It is noted that this third hash function is basically identical with the first and second hash functions. However, it can also be, e.g., freely selected by the user of the signature system according to the circumstances, e.g., the other hash functions, depending upon which hash function is provided in the system. A step comprises an asymmetric encryption of the overall check sum with a second private- or public key (depending upon additional identification demands, e.g., at the utilized electronic data processing unit or of the holder of the second key pair, e.g., the outside contractor) of a second key pair. The second key pair is comprised of the second private key and an associated second public key. In the present case, this asymmetric encryption is again performed with a PKI-encryption. Of course, it is also possible to utilize other asymmetric encryptions. The overall check sum asymmetrically encrypted as such is also invisibly attached to the document as an attachment in addition to the former attachments. Thus, the signed document 130 with the inserted signature and the encrypted attachments can then be output.

It is now also possible to examine whether the document 130 has been manipulated after the time point of the archiving. The procedure for an in-house inspection is thus performed after receipt of the document 130, which was processed according the above method, and the encrypted attachments. Herein, an overall check sum for the entire document 130 with the signature image inserted therein and the added attachments is performed for the document 130, which was output before, using the above-mentioned second hash function. If no biometric data is present, only the check sum for the document 130 with inserted signature image, the encrypted first check sum and the encrypted random value is generated.

Moreover, an asymmetric decoding of the first check sum added to the document 130 takes place using the second public- or private key (depending upon additional identification demands, e.g., at the utilized electronic data processing unit or of the holder of the second key pair, e.g., the outside contractor and the private or public key of the second key pair selected thereby during the encryption) of the second key pair. The two check sums are then compared with each other. In case the two values are identical, it can be assumed with high probability that no alteration took place. On the one hand, an alteration can mean a manipulation of the document 130 with the inserted signature image and/or the additional attachments, as well as also a transmission error during transmission of the document 130 with attachments from the outside contractor to the company. This examination, as was described herein, thus makes it possible for the company to examine the document 130 for intactness, without having to access the encrypted biometric data and, if desired, permits conclusions to be drawn about the person or the apparatus, to which the key pair can be allocated, concerning the ID of this second key pair utilized in the encryption.

A method for examining the document 130, e.g., at court with the assistance of the notary, i.e. the person, with whom the first private key of the first key pair was consigned, will now be explained. A check sum of the document 130 with the signature image inserted therein is generated using the second hash function. Moreover, the encrypted random value added to the document 130 is decoded using the first private key of the first key pair. Consequently, the sum of the check sum formed hereby, and the decoded random value is formed. This summation value is then used for the symmetric decoding of the biometric data and the first check sum, contained in this encrypted data block, which are attached to the document 130. Thus, access can now be made to the encrypted biometric data. Further, the third check sum for the document 130 with the signature image inserted therein and the encrypted biometric data can then be formed with the first hash function. Then, the verification follows whether the encrypted first check sum is identical with the formed check sum. If this is the case, it can be assumed with confidence that the document and the contained biometric data are unaltered and have not been subjected to inadvertent alteration or manipulation. If the first check sum and the generated check sum differ, then it must be assumed that an inadvertent alternation or a manipulation took place. This information is then output.

What is claimed is:

1. A method comprising:
(i) providing a computer apparatus having a first monitor configured to display an electronic document to be signed by a signer,
(ii) providing a signature capture apparatus having a second monitor and a first unique key electronically stored in the signature capture apparatus, the signature capture apparatus being an individual unit separate from, but in communication with, the computer apparatus and being configured to electronically capture a handwritten signature of the signer and biometric data of the signer's signature,
(iii) generating in the computer apparatus a first hash sum of the electronic document to be signed by the signer,
(iv) transmitting to the signature capture apparatus one of: (a) the generated first hash sum and (b) the generated first hash sum and the electronic document to be signed,
(iv.a) generating a second unique key in the signature capture apparatus by combining the first unique key and the first hash sum, (iv.b) generating a second hash sum by hashing the second unique key generated in the signature capture apparatus, (v) displaying on the first monitor of the computer apparatus the electronic document to be signed by the signer and the first hash sum of the electronic document, (vi) displaying on the second monitor of the signature capture apparatus the first hash sum transmitted from the computer apparatus, (vii) electronically capturing the handwritten signature of the signer made on the signature capture apparatus, thereby generating signature data, (viii) encrypting in the signature capture apparatus one of: (a) the signature data and (b) the signature data and the first hash sum using the generated second hash sum of the second unique key, (ix) transmitting to the computer apparatus one of: (a) the encrypted signature data and (b) the encrypted signature data and the encrypted first hash sum, and (x) storing on a computer-readable medium one of: (a) the encrypted signature data, (b) the encrypted signature data and the encrypted first hash sum and (c) the encrypted signature data, the encrypted first hash sum and the signed electronic document.

2. The method according to claim 1, further comprising:
(xi) generating in the signature capture apparatus a digital signature image of the captured handwritten signature of the signer,
(xii) transmitting the generated digital signature image to the computer apparatus, and
(xiii) displaying the transmitted digital signature image on the first monitor of the computer apparatus.

3. The method according to claim 2, further comprising:
(xiv) encrypting the first hash sum generated in step (iii) before transmitting the first hash sum to the signature capture apparatus in accordance with step (iv), and
(xv) decrypting the first hash sum in the signature capture apparatus.

4. The method according to claim 3, wherein the first unique key is generated at random and is stored in the signature capture apparatus during the manufacturing process of the signature capture apparatus in a manner that is inaccessible to the outside.

5. The method according to claim 3, further comprising:
generating a random value as the first unique key in the signature capture apparatus for each electronic document to be signed.

6. The method according to claim 3, further comprising:
displaying the electronic document on the first monitor and activating an electronic lock so that the displayed electronic document cannot be amended anymore after it has been displayed on the first monitor.

7. The method according to claim 6, wherein a third unique key is a unique serial number of the signature capture apparatus and is stored together with the encrypted signature data and the signed electronic document in method step (x).

8. The method according to claim 2, further comprising repeating the method steps (xi), (xii) and (xiii) at a predetermined frequency during execution of the handwritten signature by the signer on the signature capture apparatus so that the execution of the handwritten signature is viewable in real-time on the first monitor.

9. The method according to claim 2, wherein in method step (xi) a raster graphics image is generated as the digital signature image.

10. The method according to claim 1, further comprising:
(xiv) encrypting the first hash sum generated in step (iii) before transmitting the first hash sum to the signature capture apparatus in accordance with step (iv), and
(xv) decrypting the first hash sum in the signature capture apparatus.

11. The method according to claim 1, further comprising:
(xvi) encrypting the electronic document to be signed before transmitting it to the signature capture apparatus in accordance with step (iv), and
(xvii) decrypting the electronic document to be signed in the signature capture apparatus.

12. The method according to claim 1, wherein the first unique key is generated at random and is stored in the signature capture apparatus during the manufacturing process of the signature capture apparatus in a manner that is inaccessible to the outside.

13. The method according to claim 1, wherein a copy of the first unique key is stored at a secure location separate from the signature capture apparatus.

14. The method according to claim 1, further comprising generating a random value as the first unique key in the signature capture apparatus for each electronic document to be signed.

15. The method according to claim 1, further comprising repeating at least one of the method steps of claim 1 in order to capture a plurality of handwritten signatures executed by a plurality of signers on the signature capture device.

16. The method according to claim 1, further comprising displaying the electronic document on the first monitor and activating an electronic lock so that the displayed electronic document cannot be amended anymore after it has been displayed on the first monitor.

17. The method according claim 16, wherein method step (iii) is executed after the electronic lock has been activated.

18. The method according to claim 1, wherein a third unique key is a unique serial number of the signature capture apparatus and is stored together with the encrypted signature data and the signed electronic document in method step (x).

19. The method according to claim 1, wherein the signature data comprise at least coordinates of the signature made on a signature capture window in a predetermined resolution and in a preset coordinate system, and wherein the biometric data comprise at least one of the group consisting of:

pressure procession data of the signature made by the signer in a predetermined resolution and in a preset pressure range, time period data representing a period of time required by the signor to execute the signature in a predetermined resolution and in a preset time range and with reference to a preset coordinate system, fingerprint data representing a captured fingerprint of at least one finger of a predetermined hand of the signer in a predetermined resolution and in the preset coordinate system, handprint data representing a captured handprint of a predetermined hand of the signer in a predetermined resolution and in the preset coordinate system, facial data representing at least certain facial features of the signer in a predetermined resolution and in the preset coordinate system, voice data representing a voice sample of the signer in a predetermined resolution, and eye data representing at least certain areas of at least one of the iris and the retina of a predetermined eye of the signer in a predetermined resolution and in the preset coordinate system.

20. A signature system, comprising:
a) a computer apparatus having:
   a storage device configured to store at least an electronic document to be signed,
   a first data processing device configured to generate a first hash sum of the electronic document to be signed by a signer,
   a first monitor configured to display the electronic document to be signed by the signer and the first hash sum of the electronic document to be signed by the signer, and
   a first input/output interface electrically connected with a separate signature capture apparatus and configured to transmit at least the first hash sum of the electronic document to be signed by the signer to the signature capture apparatus, and configured to receive data from the signature capture apparatus, and
(b) the signature capture apparatus, which is a unit separate from, but in communication with, the computer apparatus via the first input/output interface, the signature capture apparatus having:
   a first unique key electronically stored in the signature capture apparatus in a manner that is inaccessable to the outside,
   a signature capture window configured to capture a signature made thereon using a writing implement, to capture biometric data of the signer's signature and to generate signature data therefrom,
   a second monitor configured to display the first hash sum transmitted from the computer apparatus,
   a second data processing device configured to encrypt one of: (a) the captured signature data and (b) the captured signature data and the first hash sum, and
   a second input/output interface electrically connected to the second monitor and the second data processing device and configured to transmit to the computer apparatus one of: (a) the encrypted signature data and (b) the encrypted signature data and first hash sum,
   wherein:
   the signature capture apparatus is configured to: generate a second unique key by combining the first unique key with the first hash sum, generate a second hash sum by hashing the second unique key, and encrypt one of: (a) the signature data and (b) the signature data and the first hash sum using the generated second hash sum.

21. The signature system according to claim 20, wherein
   the signature capture apparatus is configured such that a digital signature image of the captured handwritten signature of the signer is generated and transmitted to the computer apparatus, and
   the computer apparatus is configured such that the transmitted digital signature image is displayable on the first monitor of the computer apparatus.

22. The signature system according to claim 20, wherein the first input/output interface and the second input/output interface are configured such that the digital signature image of the captured handwritten signature of the signer is repeatedly displayable at a predetermined frequency on the first monitor of the computer apparatus during execution of the signature.

23. The signature system according to claim 22, wherein the signature capture apparatus is configured such that a raster graphics image of the handwritten signature is generated as the digital signature image at a predetermined frequency.

24. The signature system according to claim 20, wherein
   the computer apparatus is configured to encrypt the first hash sum of the stored electronic document and to transmit the encrypted first hash sum to the signature capture apparatus, and
   the signature capture apparatus is configured to decrypt the encrypted first hash sum transmitted from the computer apparatus.

25. The signature system according to claim 20, wherein
   the signature capture apparatus further comprises a random value generator configured to generate a random value, the second data processing device being configured to encrypt one of: (a) the captured signature data and (b) the captured signature data and the first hash sum using the generated random value.

26. A non-transitory computer-readable storage medium encoded with computer-readable instructions for executing the method according to claim 1.

27. The signature system according to claim 21, wherein:
   the first input/output interface and the second input/output interface are configured such that the digital signature image of the captured handwritten signature of the signer is repeatedly displayable at a predetermined frequency on the first monitor of the computer apparatus during execution of the signature,
   the signature capture apparatus is configured such that a raster graphics image of the handwritten signature is generated as the digital signature image at a predetermined frequency,
   the computer apparatus is configured to encrypt the first hash sum of the stored electronic document and to transmit the encrypted first hash sum to the signature capture apparatus,
   the signature capture apparatus is configured to decrypt the encrypted first hash sum transmitted from the computer apparatus, and
   the signature capture apparatus further comprises a random value generator configured to generate a random value, the second data processing device being configured to encrypt one of: (a) the captured signature data and (b) the captured signature data and the first hash sum using the generated random value.

* * * * *